United States Patent [19]
Auld et al.

[11] Patent Number: 5,009,305
[45] Date of Patent: Apr. 23, 1991

[54] ARTICLE ORIENTATORS

[75] Inventors: John W. Auld; Brian F. Stringer, both of St. Albans, England; Brian F. Stringer, both of St. Albans, England

[73] Assignee: Noshe Engineering Limited, England

[21] Appl. No.: 401,442

[22] PCT Filed: Mar. 8, 1988

[86] PCT No.: PCT/GB88/00173
§ 371 Date: Sep. 12, 1989
§ 102(e) Date: Sep. 12, 1989

[87] PCT Pub. No.: WO88/07016
PCT Pub. Date: Sep. 22, 1988

[30] Foreign Application Priority Data
Mar. 12, 1987 [GB] United Kingdom ............... 8705846

[51] Int. Cl.$^5$ ..................................... B65G 47/24
[52] U.S. Cl. ............................ 198/395; 198/399; 198/465.2; 198/474.1
[58] Field of Search ........... 198/395, 399, 465.2, 198/474.1, 476.1; 221/158

[56] References Cited
U.S. PATENT DOCUMENTS

| | | | |
|---|---|---|---|
| 1,696,360 | 12/1928 | Peyser | 198/474.1 |
| 3,216,551 | 11/1965 | Peck | 198/399 |
| 3,595,368 | 7/1971 | Mantovani | 198/465.2 |
| 3,961,698 | 6/1976 | Ahlenius et al. | 198/399 |
| 4,513,852 | 4/1985 | Fegley et al. | 198/399 |
| 4,530,430 | 7/1985 | Peterlini | 198/395 |
| 4,545,476 | 10/1985 | Calvert | 198/399 |
| 4,653,628 | 3/1987 | Claypool et al. | |

FOREIGN PATENT DOCUMENTS
59-74810 4/1984 Japan.

Primary Examiner—Joseph E. Valenza
Attorney, Agent, or Firm—Davis, Bujold & Streck

[57] ABSTRACT

An article orientator (11) for example for bottles is disposed in the path of a conveyor (12) for transporting the articles (13). The orientator (11) comprises a plurality of article holders (21) which are bodily movable to divert an article (13) located in the holder (21) out of the conveyor path and then back into it again with a changed orientation. The article holders (21) are movable independently of each other around a common endless path in incremental movements, the number of articles holders (21) disposed around the path being such as to leave free a path space in the endless path equal to at least one incremental movements.

14 Claims, 3 Drawing Sheets

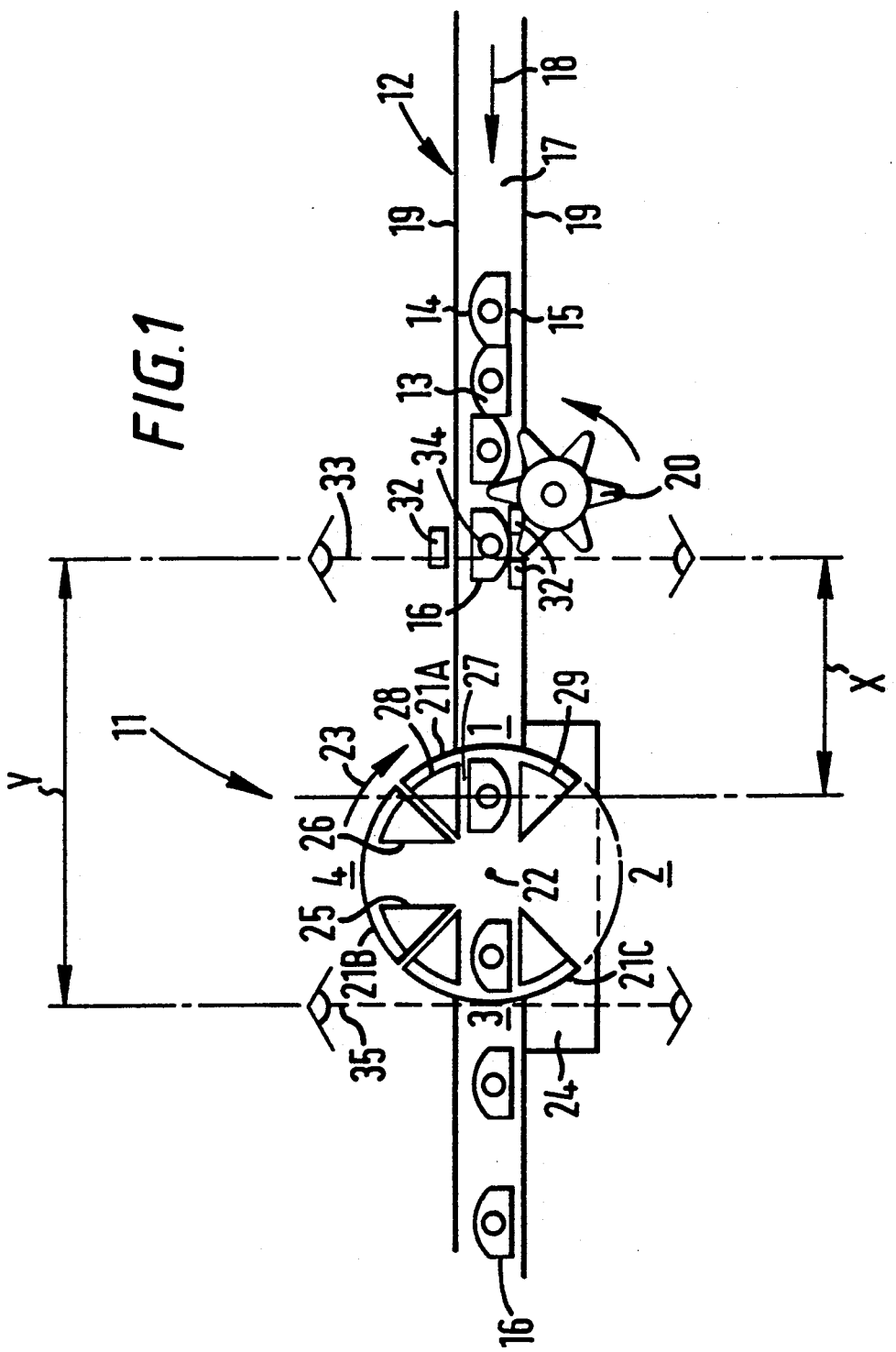

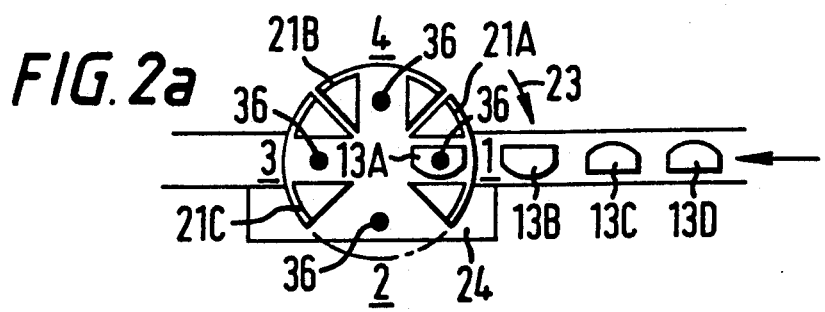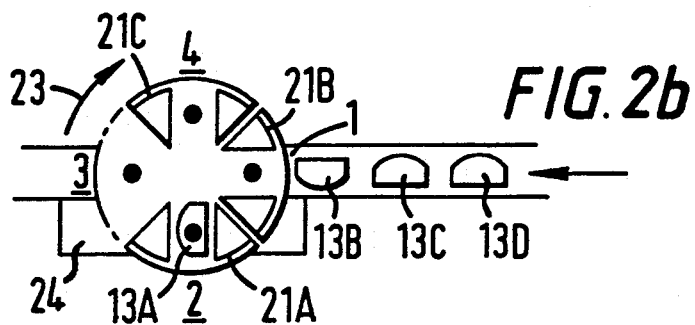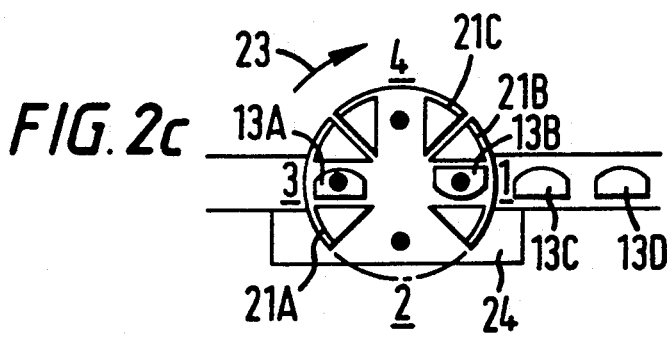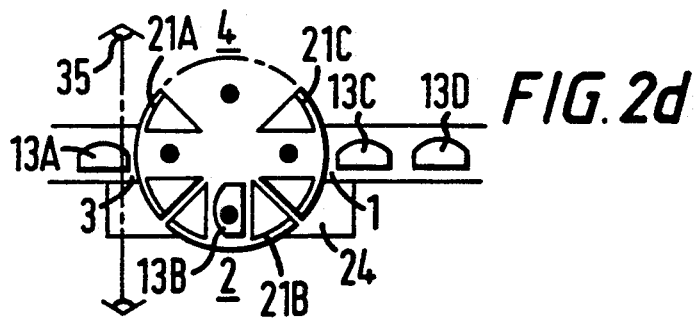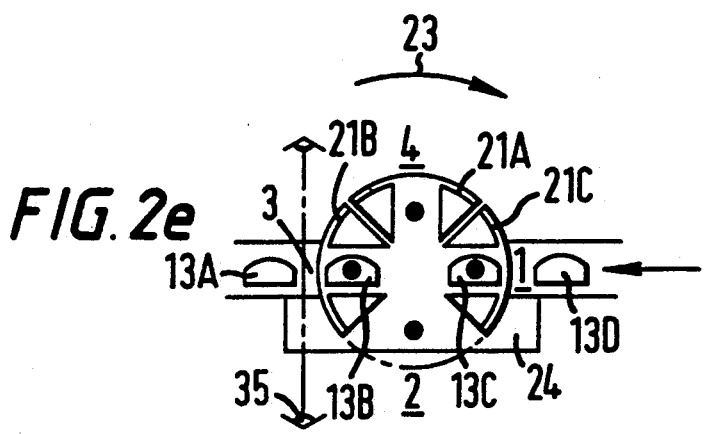

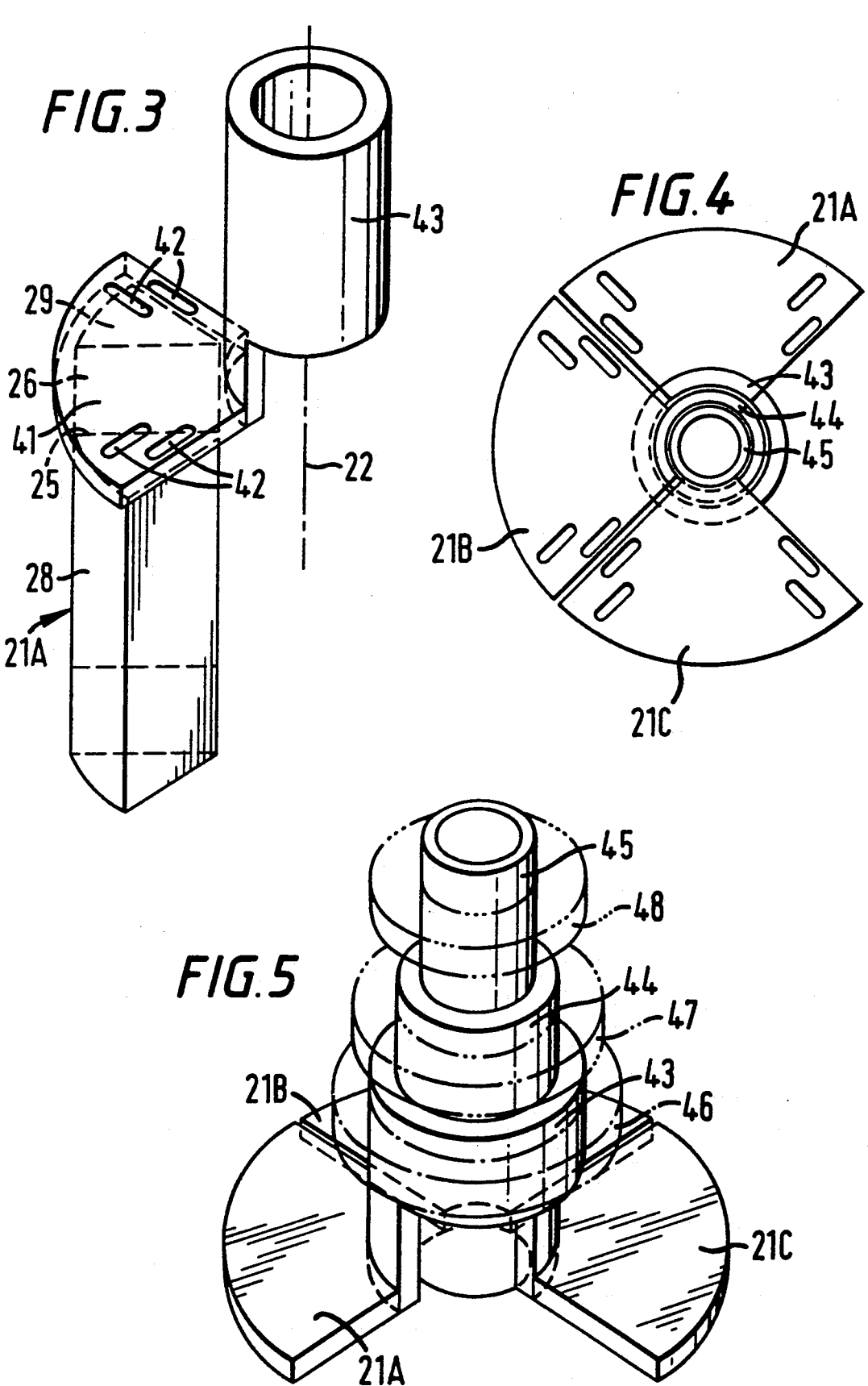

ARTICLE ORIENTATORS

This invention relates to article orientators of the kind in which selected ones of a series of articles being transported by a conveyor are turned so that they have a predetermined orientation with respect to the other articles of the series.

The invention has particular, out not exclusive, application in the glassware industry where, for example, bottles of generally rectangular cross-section and having two major faces one of which is differently shaped from the other, e.g. one is convex and the other concave or planar, are fed upright from a manufacturing machine on to a conveyor but in random orientation. The bottles are fed through the orientator which turns selected ones of the bottles so that for example they all have the same orientation.

One known orientator comprises a pair of endless belts which are arranged to be brought into frictional engagement with the circular neck of a selected bottle to be turned at diametrically opposite positions, the belts being arranged to run in opposite directions so that they apply a turning couple to the neck, to turn it for example, through 180°.

Such an orientator has certain disadvantages. One disadvantage is that if the bottle has widely differing major and minor axes and the bottles travel along the conveyor with one of their minor faces leading, space has to be provided across the width of the conveyor to accommodate the major axis when a bottle is being turned. This leads to problems in providing adequate lateral guidance for bottles being transported along the conveyor. Another disadvantage is that the turning couple imparted by the belts is somewhat imprecise. If the diameter of the bottle necks vary, the turning of some of the bottles can be greater or less than the desired amount.

The object of the present invention is to provide an orientator which does not suffer from the aforesaid disadvantages.

According to the invention, an article orientator which is disposed in the path of a conveyor for transporting the articles, comprises a plurality of article holders which are bodily movable to divert an article located in the holder out of the conveyor path and then back in to it again with a changed orientation, the article holders being movable independently of each other.

Advantageously a plurality of the article holders are arranged to move around a common endless path in incremental movements, the number of article holders disposed around said path being such as to leave free a path space in said endless path equal to at least one said incremental movement.

Preferably the article holders are arranged to be independently rotated in angular increments about a common axis so that said common endless path is circular. For example there may be three article holders arranged to be rotated in angular increments of 90° about said common axis. Thus where an article holder moves through 180° in order to divert an article off the conveyor and back on to it again, the orientation of an article in the holder is automatically changed by 180°.

One construction of orientator in accordance with the invention will now be described by way of example with reference to the accompanying drawings, in which:

FIG. 1 shows a schematic plan view of the orientator,

FIG. 2 shows a plurality of sequence diagrams for illustrating the operation of the orientator, FIG. 3 shows a perspective view of one of the article holders, FIG. 4 is a plan view of the three article holders, and FIG. 5 is a perspective view showing the driving arrangement of the three article holders.

Referring more particularly to FIG. 1, the orientator 11 is shown incorporated into a bottle conveyor 12. In this example the bottles 13 are shown as having opposing major faces, one face 14 of which is convex and the other face 15 substantially planar.

The bottles are transported by the conveyor sideways on, i.e. with one minor face 16 leading. The purpose of the orientator 11 is to turn selected bottles through 180°. For example if the bottles are fed on to the conveyor with a random orientation it may be required to have all the bottles similarly oriented so that their convex major faces 14 all point in one direction. In this case the orientator 11 will turn those bottles 13 which are detected as facing in the wrong direction. Alternatively it may be required to have the bottles 13 being transported by the conveyor sorted into successive batches with the bottles of one batch facing oppositely to the bottles of the next batch. This can be particularly advantageous when the bottles are fed from the conveyor on to palletiser, each batch of bottles providing one row on the pallet and the bottles in one row being staggered with respect to those in an adjacent row; with bottles shaped as in this example this will provide a compact and stable packing of the bottles on a pallet.

The conveyor 12 has a movable conveyor belt 17 for transporting the bottles 13 in the direction of arrow 18. The orientator 11 is so disposed in the path of the conveyor belt 17 that bottles 13 can either pass straight through it without being turned or be turned through 180°. The conveyor 12 also has side guides 19 for the bottles in the form of stationary side walls. At a predetermined position in the conveyor run upstream of the orientator 11 is located a star wheel 20 for spacing the bottles 13 prior to entering the orientator 11. The star wheel 20 is driven by a variable speed motor (not shown). Thus by setting the speed of the motor at a predetermined value the spacing of the bottles 13 is maintained substantially constant at a value related to the speed of the motor. Thus by setting the speed of the motor at a predetermined value the spacing of the bottles 13 is maintained substantially constant at a value related to the speed of the motor.

The orientator 11 comprises three bottle holders 21 which for reference purposes have been given the suffixes A, B and C. The holders 21 are independently rotatable about vertical axis 22 in the direction of arrow 23 in increments of 90° so that each bottle holder 21 can occupy each of four positions, 1, 2, 3, and 4, providing that the position is not already occupied by another of the holders 21. Positions 1 and 3 are over the conveyor belt 17 with position 3 downstream of position 1. Position 2 is over a deadplate 24 and position 4 is diametrically opposite position 2.

The holders 21 are as will be described suspended above the conveyor belt 17 and each has two facing surfaces 25 and 26 which define between them a passageway 27 for the bottles 13. If the orientation of a bottle 13 is not to be changed then it can pass right through the passageway 27. As will be described in more detail with reference to FIGS. 3 to 5 the holders 21 each comprise as seen in plan view two sector shaped members 28 and 29 which are secured to a quadrant shaped top plate 41 so that their facing surfaces 25 and 26 are spaced apart the desired amount to receive a bottle. In order to change the orientation of a selected bottle 13 as it is being transported on the belt 17 it is arranged that when the bottle 13 reaches a predetermined location between the surfaces 25 and 26 of the holder 21 in position 1 the holder 21 is rotated to position 2 to sweep the bottle off the conveyor belt 17 on to the deadplate 24. When that holder is then rotated from position 2 to position 3 the bottle will be swept back onto the conveyor belt 17 and will then be conveyed from the orientator by the belt 17. Such a movement will reverse the orientation of a bottle as can be seen from FIG. 1, in that if the bottle in holder 21A at position 1 is rotated round to position 3, this will effectively rotate the bottle through 180° about its own vertical axis.

A control system is provided for determining the orientation of the bottles 13 and changing that of selected bottles. The control system has orientation sensors 32 which are positioned just downstream of the star wheel 20 and check for the shape of the bottles or markings on the bottles 13 and so determine the orientation of each bottle. There is also a leading edge sensor 33 which in this example senses the leading edge of the neck 34 of each bottle as it passes in order to trigger the orientation sensors 32 when the bottles are in a precise position. The three orientation sensors 32 are used if orientation is to be detected by shape and only one is used if the orientation is to be detected by markings such as raised lettering on the bottles.

The independent rotational movement of the holders 21 must also be controlled by the control system so that the holders 21 move into positions which are free and so that they only move from positions 2 and 3 under certain conditions. For this purpose the control system also employs the leading edge sensor 33 as an entry sensor to indicate so to speak the start position of a bottle entering the orientator 11. A sensor 35 is also provided and constitutes an exit sensor which detects when a bottle has just cleared the orientator 11. A head sensor 36 shown schematically in FIG. 2 is mounted in a stationary head plate of the orientator at each of the position 1 to 4 to determine if a holder 21 is present at that position.

The operation of the orientator is advantageously controlled using a micro-computer. If the sensors 32 checking orientation, detect a "wrong" bottle, i.e. one that is required to be turned by the orientator 11, then the micro-computer has to be programmed to ensure that a holder 21 is waiting for it at position 1 and that position 2 is free so that it can be swept immediately into position 2 by the holder 21. Other control parameters are the distances 'X' and 'Y', the condition of the exit sensor 35 and the condition of the head sensors 36. Each time a bottle passes the start sensor 33 two counters are triggered to start counts related to that bottle. One of them provides a signal when the count indicates that the belt 17 has travelled distance 'X' and the other provides a signal when the count indicates that the belt 17 has travelled the distance 'Y' from the time the count started. The distances 'X' and 'Y' can conveniently be measured using disc encoders which for example produce 200 pulses per revolution and have a friction wheel of 200 mm. circumference driven from or at the same speed as the conveyor belt 17. Thus each pulse represents 1 mm. movement of the belt 17 and so the counters step-up or step-down by 1 as the case may be for each mm. of belt travel. The distance 'X' shown in FIG. 1 is the distance the bottle is required to move to correctly locate it in a holder 21 in position 1 of the orientator 11 so that it can be swept on to the deadplate 24 at position 2. The distance 'Y' is the distance which a bottle passing straight through the orientator has to move in order to clear the orientator.

The operation of the orientator will now be described with respect to the sequence diagram of FIG. 2. The starting position of the holders 21 for receiving a "wrong" bottle 13 is as shown in FIG. 2a. A "wrong" bottle whose orientation is to be reversed is already shown in holder 21A in Position 1. Holders 21B and 21C are in positions 4 and 3 respectively. For convenience of distinguishing between the bottles in the line approaching the orientator 11 they have been given the suffix letters A, B, C, and D, bottles 13A and B being "wrong" bottles and 13C and D "right" bottles.

As soon as the pulses from the encoder indicate that the bottle has travelled distance 'X' holder 21A is rotated to position 2 so that the bottle 13A is moved on to deadplate 24. Holder 21B immediately moves from position 4 to position 1 ready to receive the next "wrong" bottle 13B as soon as the head sensor 36 at position 1 indicates that it is clear to do so. Hence there is always a holder at position 1 to receive each bottle. Holder 21C can then move from position 3 to position 4 if the conditions specified hereafter are met. The situation is then as shown in FIG. 2b. Holder 21A can then move to position 3 to deliver the bottle 13 back on to the conveyor belt in its desired orientation providing other conditions specified hereafter are met. The position is then shown in FIG. 2c and holder 21B has received the next "wrong" bottle 13B.

The most critical position is position 3. The entry conditions for a holder 21 to enter position 3 are (a) The encoder pulses have reached the number to indicate that any bottle which has passed the start position has travelled on the belt the distance 'Y', assuming it is a "right" bottle.
(b) The exit sensor 35 is clear.
(c) The head sensor 36 at position 3 is clear.

The counters reset on reaching the set number. There will be several counts going through a shift register at any one time since there will be several bottles between the starwheel 20 and the exit position at any one time.

The conditions for a holder to leave position 3 are (a) The pulses have reached the set number for the 'Y' distance.
(b) The exit sensor 35 is clear.
(c) The head sensor at position 4 is clear.

FIG. 2d shows the situation where the holder 21B has moved the bottle 13B to the deadplate 24 and the holder 21C has moved to position 1 in time for the passage of the next bottle which is "right" bottle 13C. Meanwhile the bottle 13A is shown passing through the exit sensor 35. As soon as it clears it as shown in FIG. 2e the holder 21A moves to position 4 assuming the other specified conditions are met. The holder 21B then moves to position 3 and holder 21C receives a good bottle 13C which will pass straight through the orientator on the belt 17.

In a simpler control system, only entry and exit sensors are used and the outputs of these are interrelated through computer control to control the movements of the orientator 11.

Referring now to FIGS. 3 to 5, these show the mechanical details of the holders 21. The sectors 28 and 29 are bolted to top plate 41 by bolts located in elongated slots 42 which allow radial adjustment of the sectors to vary the width of the passageway 27 between them to suit different width bottles. The top plate 41 is secured to a hollow drive shaft 43.

The holders 21A, 21B and 21C are mounted on respective drive shafts 43, 44 and 45 which are coaxially disposed so that they rotate about common axis 22. The two outer shafts are cut away as best shown in FIGS. 4 and 5 to permit location of the top plates 41 in the same plane and relative rotation of the holders 21 through 90°. Each of the shafts 43, 44 and 45 as shown in FIG. 5 has a respective gear wheel 46, 47, 48 which is arranged to mesh with a gear wheel driven through a respective electromagnetic or wrapped spring clutch from a common motor drive. Thus actuation of the clutch from the control system cause the holders 21 to move in increments of 90° at high speed as selected.

It will be appreciated that if desired bottles 13 could be extracted from the orientator at position 2 having been turned through 90°. In this case the deadplate 24 may be replaced by or associated with a conveyor.

It will also be appreciated that the number of holders 21 can be greater than three if required.

As an alternative to using a clutch a stepper motor may be used to drive the holders 21.

We claim:

1. An article orientator for disposition above a conveyor for transporting articles, said orientator comprising a plurality of article holders independently supported to enable each holder to be moved into and out of the path of the conveyor and being operative to divert an article received by it out of the conveyor path and then back into it again with a changed orientation, the article holders being disposed to move around a common endless track in incremental movements, and the number of article holders disposed around said endless track being such as to leave a free track space around the track equal to at least one said incremental movement.

2. An article orientator according to claim 1, characterised in that said article holders are arranged to be rotated independently in angular increments about a common axis so that said common endless path is circular.

3. An article orientator according to claim 2, characterised in that there are three article holders arranged to be rotated in angular increments of 90° about said common axis.

4. An article orientator according to claim 3, characterised in that an article holder moves through 180° in order to divert an article off the conveyor and back on to it again, whereby the orientation of an article in the holder is automatically changed by 180°.

5. An article orientator according to claim 2, characterised in that the article holders are suspended above the conveyor and have two facing surfaces which define between them a passageway for the articles on the conveyor, so that if the orientation of an article is not to be changed it can pass straight through a holder positioned in the path of the conveyor to receive it.

6. An article orientator according to claim 5, characterised in that the spacing between said facing surfaces can be varied to suit different sized articles.

7. An article orientator according to claim 5, characterised in that the incremental movement of the article holders is so controlled that there is always an article holder waiting at a first position in the path of the conveyor to receive each article on the conveyor.

8. An article orientator according to claim 7, characterised in that the incremental movement of the article holders is so controlled that an article received in an article holder at said first position and whose orientation is to be changed is swept laterally off the conveyor by an incremental movement of the article holder from said first to a second position and a second article holder is then moved into said first position in time to receive the next article on the conveyor.

9. An article orientator according to claim 8, characterised in that the orientator is so controlled that an incremental movement from said second position to a third position which is in the path of said conveyor downstream of said first position delivers the article back on to the conveyor.

10. An article orientator according to claim 9, characterised in that the orientator is so controlled that an article holder in said third position is moved by an incremental movement to a fourth position out of the conveyor path, prior to moving by one or more further incremental movements back in to said first position.

11. An article orientator according to claim 7 characterised in that the spacing of the articles approaching said first position on said conveyor is controlled so that it is maintained substantially constant.

12. An article orientator according to claim 11 characterised in that the spacing can be adjusted.

13. An article orientator according to claim 1, characterised in that entry and exit sensors are provided for sensing an article as it enters the orientator and for sensing an article when it leaves the orientator respectively.

14. An article orientator according to claim 13, characterised in that an orientation sensor is positioned to sense the orientation of an article as it enters the orientator and is triggered to operate by said entry sensor.

* * * * *